United States Patent
Hao et al.

(10) Patent No.: US 9,768,968 B2
(45) Date of Patent: Sep. 19, 2017

(54) METHOD AND APPARATUS FOR PROCESSING MULTICAST PACKET ON NETWORK VIRTUALIZATION OVER LAYER 3 (NVO3) NETWORK

(71) Applicant: Huawei Technologies Co., Ltd., Shenzhen (CN)

(72) Inventors: Weiguo Hao, Nanjing (CN); Yizhou Li, Nanjing (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 14/980,649

(22) Filed: Dec. 28, 2015

(65) Prior Publication Data

US 2016/0142220 A1 May 19, 2016

Related U.S. Application Data

(63) Continuation of application No. PCT/CN2013/078386, filed on Jun. 28, 2013.

(51) Int. Cl.
*H04L 12/28* (2006.01)
*H04L 12/18* (2006.01)
(Continued)

(52) U.S. Cl.
CPC .......... *H04L 12/18* (2013.01); *H04L 12/1886* (2013.01); *H04L 12/46* (2013.01);
(Continued)

(58) Field of Classification Search
CPC ..... H04L 12/18; H04L 12/4633; H04L 45/74; H04L 45/16
(Continued)

(56) References Cited

U.S. PATENT DOCUMENTS

2009/0268746 A1 10/2009 Ogasahara et al.
2011/0075673 A1* 3/2011 Hardie ................ H04L 12/4633
370/401
(Continued)

FOREIGN PATENT DOCUMENTS

| CN | 102868642 A | 1/2013 |
| CN | 103095546 A | 5/2013 |
| WO | 2013067466 A1 | 5/2013 |

OTHER PUBLICATIONS

Foreign Communication From a Counterpart Application, European Application No. 13888499.4, Extended European Search Report dated Apr. 29, 2016, 5 pages.
(Continued)

*Primary Examiner* — Faisal Choudhury
(74) *Attorney, Agent, or Firm* — Conley Rose, P.C.

(57) ABSTRACT

A first multihoming network virtualization edge (NVE) configured to receive a first multicast packet sent by a multihomed tenant end system (TES), acquire an ingress port of the first multicast packet and a virtual local area network (VLAN) identifier (ID) of the first multicast packet, acquire a virtual overlay network (VN) ID of the first multicast packet according to the ingress port and the VLAN ID, determine whether the ingress port is a designated forwarder (DF) of the VN ID, encapsulate the first multicast packet with an extended NVO3 header when the ingress port is not the DF of the VN ID, and send the first multicast packet that is encapsulated with the extended NVO3 header to another NVE that includes a second multihoming NVE, where the extended NVO3 header carries the VN ID and a link aggregation group (LAG) ID that corresponds to the ingress port.

20 Claims, 4 Drawing Sheets

(51) Int. Cl.
*H04L 12/46* (2006.01)
*H04L 12/761* (2013.01)
*H04L 12/741* (2013.01)

(52) U.S. Cl.
CPC ...... *H04L 12/4633* (2013.01); *H04L 12/4641* (2013.01); *H04L 45/16* (2013.01); *H04L 45/74* (2013.01)

(58) Field of Classification Search
USPC .......................................... 370/390
See application file for complete search history.

(56) References Cited

U.S. PATENT DOCUMENTS

| | | | |
|---|---|---|---|
| 2012/0219004 A1 | 8/2012 | Balus et al. | |
| 2013/0058208 A1* | 3/2013 | Pfaff | H04L 12/4633 370/217 |
| 2013/0142201 A1 | 6/2013 | Kim et al. | |
| 2014/0192804 A1* | 7/2014 | Ghanwani | H04L 49/70 370/390 |
| 2014/0307744 A1* | 10/2014 | Dunbar | H04L 45/44 370/401 |
| 2015/0188769 A1* | 7/2015 | Gu | H04L 12/4641 726/3 |

OTHER PUBLICATIONS

Boutros, S., et al., "VXLAN DCI Using EVPN," draft-boutros-l2vpn-vxlan-evpn-01.txt, Feb. 24, 2013, 8 pages.
Sajassi, A., et al., "BGP MPLS Based Ethernet VPN," draft-ietf-l2vpn-evpn-03.txt, Feb. 25, 2013, 47 pages.
Foreign Communication From a Counterpart Application, PCT Application No. PCT/CN2013/078386, English Translation of International Search Report dated Mar. 27, 2014, 2 pages.
Foreign Communication From a Counterpart Application, PCT Application No. PCT/CN2013/078386, English Translation of Written Opinion dated Mar. 27, 2014, 7 pages.

* cited by examiner

METHOD AND APPARATUS FOR PROCESSING MULTICAST PACKET ON NETWORK VIRTUALIZATION OVER LAYER 3 (NVO3) NETWORK

CROSS-REFERENCE TO RELATED APPLICATION

This application is a continuation of International Patent Application No. PCT/CN2013/078386, filed on Jun. 28, 2013, which is hereby incorporated by reference in its entirety.

TECHNICAL FIELD

The present disclosure relates to the field of communications, and in particular, to a method and an apparatus for processing a multicast packet on a network virtualization over layer 3 (NVO3) network.

BACKGROUND

NVO3 may implement a layer 2 virtual private network (VPN) by using media access processing (MAC) in Internet protocol (IP) encapsulation. Virtual extensible local area network (VXLAN) and network virtualization generic routing encapsulation (NVGRE) are two typical technologies for implementing NVO3 networking. For VXLAN and NVGRE, by using MAC in user datagram protocol (UDP) encapsulation or MAC in GRE encapsulation, layer 2 packets in different VPNs may be transmitted across a layer 3 IP network. VXLAN tunnel encapsulation and NVGRE tunnel encapsulation both include a 24-bit virtual overlay network (VN) identifier (ID). By encapsulating a VN ID in a packet, traffic may be isolated between different virtual overlay networks. In a data center, one tenant may correspond to one or more virtual overlay networks.

A VN edge device is called a network virtualization edge (NVE), and a main function of the NVE is to join a tenant end system (TES) to a virtual overlay network. The NVE may isolate traffic between different virtual overlay networks by using VN IDs. Corresponding multicast and unicast forwarding tables of each virtual overlay network are stored in the NVE. The NVE replicates and sends, according to a local multicast forwarding table, multicast traffic (including unknown unicast, broadcast, and multicast, which are uniformly referred to as multicast herein) sent by a local TES to another TES. The NVE replicates and forwards, according to a network-side multicast forwarding table corresponding to a virtual overlay network of the TES, the multicast traffic sent by the local TES, to a remote NVE. When a multicast packet is sent to a remote NVE, two manners, head-end replication and multicast hop-by-hop replication, may be used. Unicast NVO3 encapsulation is used in the head-end replication manner, where a destination IP of a tunnel is an IP address of a destination NVE. In the multicast replication manner, the destination IP of a tunnel is a multicast IP address. A correspondence between VNs and multicast IP addresses is preset on each NVE by a network administrator. By searching a unicast forwarding table, an NVE forwards, to a local TES or a remote NVE, a unicast packet sent by a TES. When the unicast packet is forwarded to the remote NVE, unicast NVO3 encapsulation needs to be performed on the unicast packet.

FIG. 1 is a schematic structural diagram of an NVO3 network in the prior art. Each TES separately accesses a VN by using a respective NVE. To ensure TES reliability, a TES may access a network by using multiple NVEs. As shown in FIG. 1, a TES 1 accesses the NVO3 network separately by using a port 1 of an NVE 1 and a port 2 of an NVE 2. This access manner is called multihoming access. The NVE 1 and the NVE 2 for connecting the TES 1 are called multihoming NVEs. The port 1 of the NVE 1 and the port 2 of the NVE 2 form a cross-device link aggregation group (LAG). TES1 is called a multihomed TES, and an NVE other than a multihoming NVE is called a remote NVE of the multihoming NVE. When the multiple multihoming NVEs can all forward a packet from the multihomed TES, this access manner is called all-active or active-active access.

In an all-active or active-active scenario, for a multicast packet in a VN, it is required that:

1. When multihoming NVEs replicate and forward, to a local port, a multicast packet sent by a remote NVE, it is avoided that a multihomed TES receives multiple copies of the multicast packet sent by the remote NVE, and 2. A split horizon mechanism can be provided between the multihoming NVEs, to avoid that a packet sent by a multihomed TES is looped back to the multihomed TES by using an NVO3 network.

In the prior art, a horizontal splitting method is provided. A multihoming NVE configures, for each LAG, an IP address as a source IP address for the multihoming NVE to send a packet by using a port in the LAG The multihoming NVE records a correspondence between the LAG and the IP address. NVEs on the NVO3 network are mutually notified of their correspondences between LAGs and IP addresses, and each NVE records correspondences between LAGs and IP addresses of other NVEs.

After receiving a multicast packet sent by a second NVE, a first NVE searches, according to a source IP address in the multicast packet, a correspondence between LAGs and IP addresses that is recorded by the first NVE. If there is no LAG corresponding to the source IP address, the first NVE replicates, according to a VN ID in the multicast packet, the multicast packet to all local ports corresponding to the VN ID. If there is a LAG corresponding to the source IP address, and the first NVE and the second NVE belong to a same LAG, the first NVE does not replicate the multicast packet to a local port corresponding to the LAG The local port refers to a port connected to a TES.

Research finds that, in the foregoing horizontal splitting method, the multihoming NVE needs to allocate an IP address to each LAG If there is a large quantity of LAGs on a network, IP address wasting is caused. In addition, each multihoming NVE needs to determine whether an IP address of every other multihoming NVE and an IP address of the multihoming NVE belong to a same LAG Consequently, packet forwarding efficiency drops if there is a large quantity of multihoming NVEs.

SUMMARY

The present disclosure provides a method and an apparatus for processing a multicast packet on an NVO3 network, and an NVO3 network, used to solve a problem that is of IP address wasting and forwarding performance degradation and is caused in an all-active or active-active TES access scenario.

A first aspect of the present disclosure provides a method for processing a multicast packet on a network virtualization over a layer 3 network NVO3 network, where the method includes: receiving a first multicast packet; acquiring an ingress port of the first multicast packet and a virtual local area network (VLAN) ID of the first multicast packet when a sender of the first multicast packet is a local multihomed tenant end system TES, and acquiring a virtual overlay network identifier VN ID of the first multicast packet according to the ingress port and the VLAN ID; determining whether the ingress port is the designated forwarder DF of the VN ID; and encapsulating the first multicast packet with an extended NVO3 header when the ingress port is the DF of the VN ID, and sending the first multicast packet that is encapsulated with the extended NVO3 header to a NVE, where the extended NVO3 header carries the VN ID of the first multicast packet and a LAG ID that corresponds to the ingress port.

A second aspect of the present disclosure provides an apparatus for processing a multicast packet on a network virtualization over layer 3 NVO3 network, where the apparatus includes: a receiving module, configured to receive a first multicast packet; a determining module, configured to determine a sender of the first multicast packet, and trigger a first virtual overlay network identifier VN ID acquiring module when it is determined that the sender of the first multicast packet is a local multihomed TES; the first VN ID acquiring module, configured to acquire an ingress port of the first multicast packet and a virtual local area network identifier VLAN ID of the first multicast packet, and acquire a VN ID of the first multicast packet according to the ingress port and the VLAN ID; a first judging module, configured to determine whether the ingress port is a designated forwarder (DF) of the VN ID, and trigger a first sending module when the ingress port is not the DF of the VN ID; and the first sending module, configured to encapsulate the first multicast packet with an extended NVO3 header, and send the first multicast packet that is encapsulated with the extended NVO3 header to another NVE, where the extended NVO3 header carries the VN ID of the first multicast packet and a link aggregation group identifier LAG ID that corresponds to the ingress port.

A third aspect of the present disclosure provides a NVO3 network, where the NVO3 network includes a multihomed tenant end system TES, a first multihomed network virtualization edge NVE, and a second multihoming NVE, where the multihomed TES is separately connected to the first multihoming NVE and the second multihoming NVE; the multihomed TES is configured to send a first multicast packet; and the first multihoming NVE is configured to receive the first multicast packet, determine a sender of the first multicast packet, and when it is determined that the first multicast packet is sent by the multihomed TES, acquire an ingress port of the first multicast packet and a virtual local area network identifier VLAN ID of the first multicast packet; acquire a virtual overlay network identifier VN ID of the first multicast packet according to the ingress port of the first multicast packet and the VLAN ID; determine whether the ingress port is a designated forwarder DF of the VN ID of the first multicast packet; when the ingress port is not the DF of the VN ID of the first multicast packet, encapsulate the first multicast packet with an extended NVO3 header; and send the first multicast packet that is encapsulated with the extended NVO3 header to another NVE that includes the second multihoming NVE, where the extended NVO3 header carries the VN ID of the first multicast packet and a LAG ID that corresponds to the ingress port.

A fourth aspect of the present disclosure provides an apparatus for processing a multicast packet on a NVO3 network, where the apparatus includes a processor, a memory, a network interface, and a bus, where the processor, the memory, and the network interface are all connected to the bus, and the memory is configured to store a program instruction; and the processor is configured to read the program instruction stored in the memory, and execute the method of the first aspect of the present disclosure according to the program instruction.

In the foregoing embodiments of the present disclosure, when a first multihoming NVE receives a first multicast packet from a multihomed TES, and when it is determined that an ingress port of the first multicast packet is not a DF of a VN ID carried in the first multicast packet, the first multihoming NVE does not forward the first multicast packet to a local port, thereby avoiding that the first multicast packet sent by the multihomed TES is looped back to the multihomed TES. In addition, by extending an existing NVO3 header and using an existing LAG ID, IP address wasting can be avoided, thereby improving the forwarding efficiency.

BRIEF DESCRIPTION OF DRAWINGS

To describe the technical solutions in the embodiments of the present disclosure or in the prior art more clearly, the following briefly introduces the accompanying drawings required for describing the embodiments.

DESCRIPTION OF EMBODIMENTS

Figure 1:
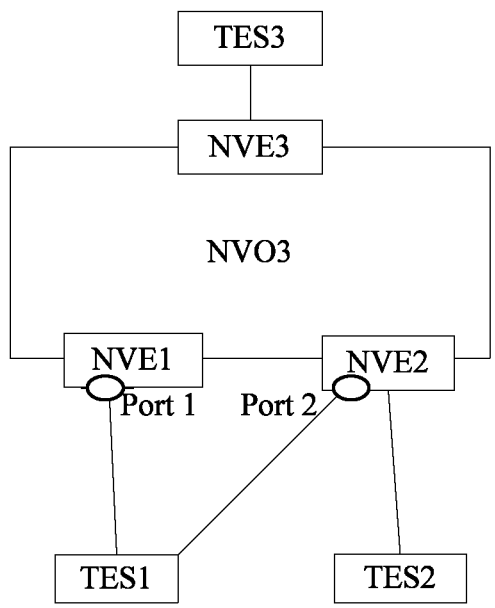
FIG. 1 is a schematic structural diagram of an NVO3 network in the prior art.
Figure 2:
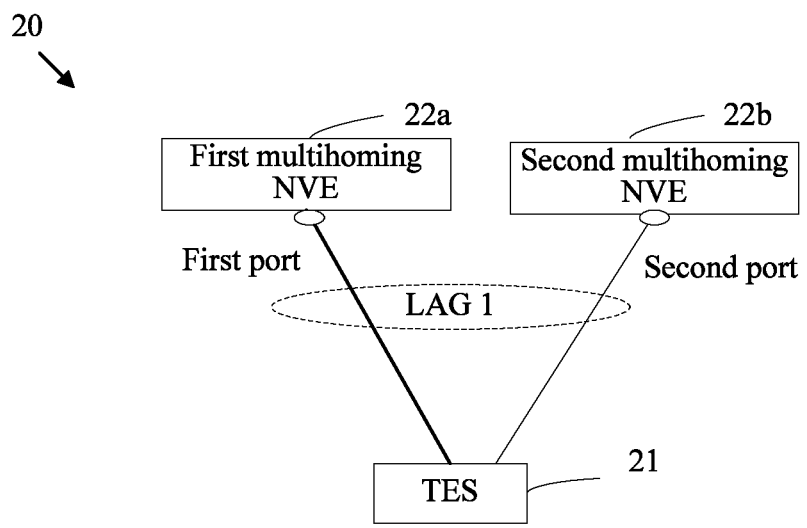
FIG. 2 is a schematic structural diagram of an NVO3 network according to an embodiment of the present disclosure.

An embodiment of the present disclosure provides an NVO3 network. As shown in FIG. 2, the NVO3 network 20 includes a multihomed TES 21 and multiple multihoming NVEs, such as a first multihoming NVE 22a and a second multihoming NVE 22b in the figure. The multihomed TES 21 is separately connected to the first multihoming NVE 22a and the second multihoming NVE 22b. The first multihomed TES 21 is configured to send a first multicast packet, where the first multicast packet includes all packets, such as a broadcast packet, a multicast packet, or an unknown unicast packet, that need to be sent in a multicast manner on the NVO3 network 20.

The first multihoming NVE 22a is configured to receive the first multicast packet and determine a sender of the first multicast packet. When the first multihoming NVE 22a determined that the first multicast packet is sent by the multihomed TES 21, the first multihoming NVE 22a acquires an ingress port of the first multicast packet and a VLAN ID of the first multicast packet, acquires a VN ID of the first multicast packet according to the ingress port of the first multicast packet and the VLAN ID, and determines whether the ingress port is a DF of the VN ID of the first multicast packet. When the ingress port is not the DF of the VN ID of the first multicast packet, the first multihoming NVE 22a encapsulates the first multicast packet with an extended NVO3 header, sends the first multicast packet that is encapsulated with the extended NVO3 header to another NVE, which may include the second multihoming NVE 22b. The extended NVO3 header carries the VN ID of the first multicast packet and a link aggregation group identifier LAG ID that corresponds to the ingress port.

The first multihoming NVE 22a may send the first multicast packet that is encapsulated with the extended NVO3 header to the other NVE in a manner of head-end replication or multicast hop-by-hop replication.

If the head-end replication manner is used, the first multihoming NVE 22a replicates the packet for each destination NVE, and sends the replicated packet to each destination NVE through a unicast NVO3 tunnel, where an outer destination IP address of the NVO3 tunnel is a unicast IP address of each destination NVE. If the multicast hop-by-hop replication manner is used, the first multihoming NVE 22a sends the packet to each destination NVE through a multicast NVO3 tunnel, where an outer destination IP address of the NVO3 tunnel is a multicast IP address. A correspondence between VN IDs and multicast IP addresses is preset on the first multihoming NVE 22a.

When head-end replication is used, the LAG ID only needs to be unique on each NVE, where a LAG ID in the extended NVO3 header is a LAG ID allocated on the destination NVE. For example, a TES is multihomed to port 1 of NVE1, port 2 of NVE2, and port 3 of NVE3. Then, port 1, port 2, and port 3 form a LAG NVE1 allocates an identifier 10 to the LAG, NVE2 allocates an identifier 20 to the LAG, and NVE3 allocates an identifier 30 to the LAG When NVE1 sends a packet to NVE2 and NVE3, 20 and 30 are respectively filled in LAG IDs of extended NVO3 headers.

When multicast replication is used, the LAG ID needs to be unique on the entire network. In the same case described in the foregoing, NVE1, NVE2, and NVE3 all record an identifier 10 of the LAG When NVE1 sends a packet to NVE 2 and NVE3, 10 is filled in LAG IDs of extended NVO3 headers.

In an embodiment, the first multihoming NVE 22a searches a DF table according to the ingress port and the VN ID of the first multicast packet, and determines whether the ingress port is a designated forwarder DF of the VN ID of the first multicast packet. When in the DF table there is no entry that is corresponding to the VN ID of the multicast packet of the first multicast packet and the ingress port, or when a DF marker in a found entry indicates that the ingress port is not the DF, it is determined that the ingress port is not the DF of the VN ID.

In another embodiment, the first multihoming NVE 22a is further configured to record LAG information, where the LAG information includes a LAG ID and ports included in LAG The first multihoming NVE 22a is further configured to negotiate with the second multihoming NVE 22b according to the LAG information, select one port from all the ports in the link aggregation group as a DF of a VN ID of the multihomed TES 21, and record a negotiation result in a DF table. The VN ID is used to identify a VN to which the multihomed TES 21 belongs. The DF table includes VN IDs, ports, and DF markers, where the DF marker is used to mark whether a port is a DF of a VN ID. For example, LAG information shown in FIG. 2 includes a LAG, where a LAG ID of the LAG is LAG 1, which includes a first port and a second port.

The first multihoming NVE 22a is further configured to receive a second multicast packet sent by the second multihoming NVE 22b, perform NVO3 decapsulation on the second multicast packet, and acquire a VN ID of the second multicast packet from an NVO3 header of the second multicast packet, look up a local multicast forwarding entry corresponding to the VN ID of the second multicast packet, acquire an egress port in the local multicast forwarding entry, determine whether the egress port is a designated forwarder DF of the VN ID of the second multicast packet, and process the decapsulated second multicast packet according to a result of the determining.

In an embodiment, when the first multihoming NVE 22a determined that the egress port is not the DF of the VN ID of the second multicast packet, the first multihoming NVE 22a is further configured to discard the decapsulated second multicast packet.

In another embodiment, when the first multihoming NVE 22a determined that the egress port is the DF of the VN ID of the second multicast packet, the first multihoming NVE 22a is further configured to determine whether the second multicast packet and the egress port have a same LAG ID, where a LAG ID of the second multicast packet is obtained from an NVO3 header of the second multicast packet. When the second multicast packet and the egress port have the same LAG ID, the first multihoming NVE 22a is further configured to discard the decapsulated second multicast packet. When the second multicast packet and the egress port do not have the same LAG ID, the first multihoming NVE 22a is further configured to forward the decapsulated second multicast packet by using the egress port.

It should be noted that in this embodiment of the present disclosure, a local multicast forwarding table and a local DF table include only ports. When the port is a port for receiving a packet, the port is an ingress port. When the port is used for sending a packet, the port is an egress port. Therefore, the ingress port and the egress port are only differentiated in terms of multicast packet direction, and do not affect information in the local multicast forwarding table or the local DF table.

In the foregoing embodiment of the present disclosure, when a first multihoming NVE 22a receives a first multicast packet from a multihomed TES 21, and when it is determined that an ingress port of the first multicast packet is not a DF of a VN ID carried in the multicast packet, the first multihoming NVE 22a does not forward the first multicast packet to a local port, thereby avoiding that the first multicast packet sent by the multihomed TES 21 is looped back to the multihomed TES 21. In addition, by extending an existing NVO3 header and using an existing LAG ID, IP address wasting can be avoided, thereby improving the forwarding efficiency.

Figure 3:
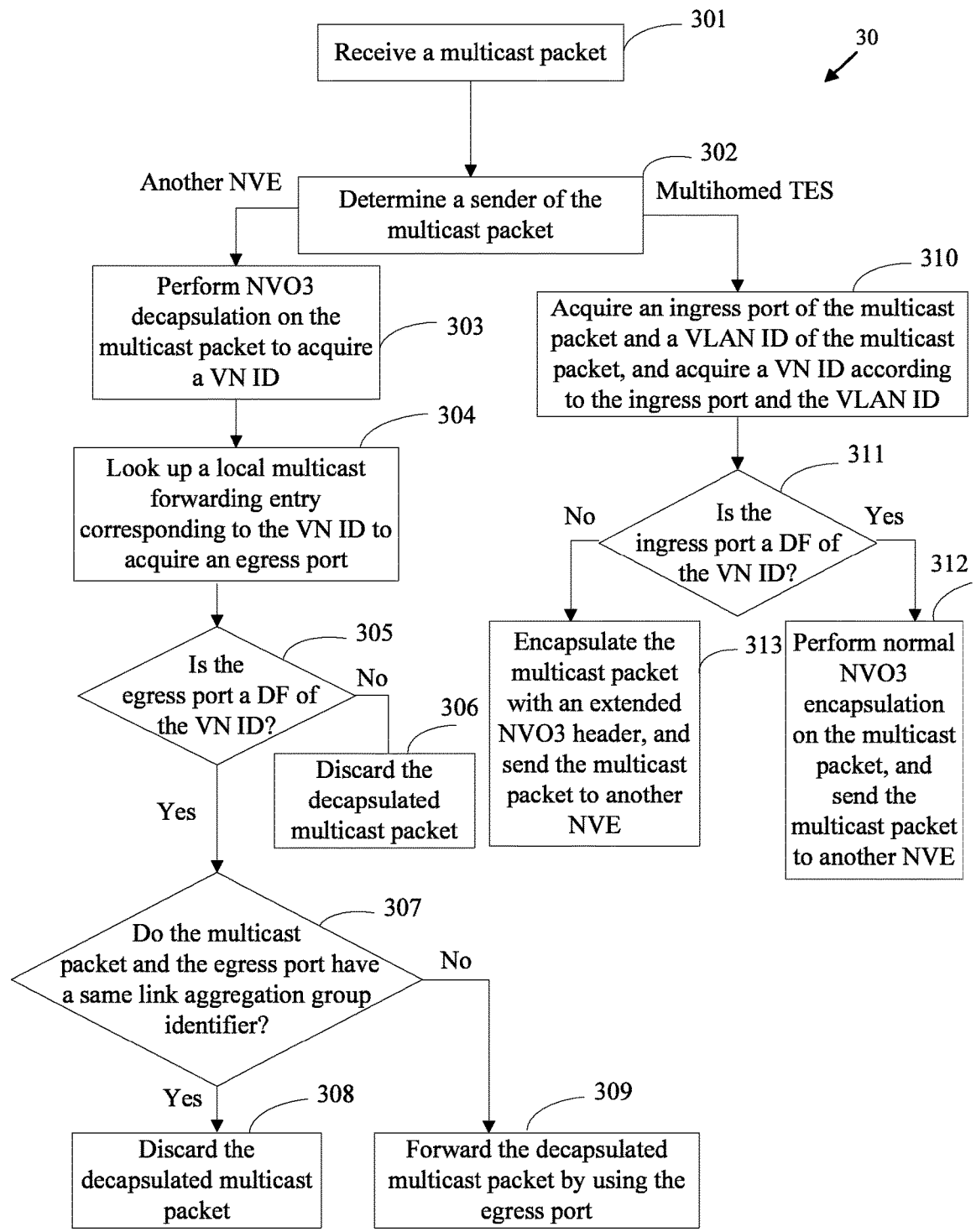
FIG. 3 is a schematic flowchart of a method for processing a multicast packet on an NVO3 network according to an embodiment of the present disclosure.

An embodiment of the present disclosure further provides a method for processing a multicast packet on an NVO3 network. The method applies to the NVO3 network 20 shown in FIG. 2, and may be executed by any multihoming NVE in the multiple multihoming NVEs. A first multihoming NVE is used as an example for descriptions of FIG. 3. For specific details not described in the foregoing NVO3 network embodiment, reference may be made to descriptions in this embodiment. As shown in FIG. 3, the method 30 includes:

Step 301: The first multihoming NVE receives a multicast packet. The multicast packet includes all packets, such as a broadcast packet, a multicast packet, or an unknown unicast packet, that need to be sent in a multicast manner on the NVO3 network.

Step 302: The first multihoming NVE determines a sender of the multicast packet, performs step 303 when the sender of the multicast packet is another NVE, and performs step 310 when the sender of the first multicast packet is a local multihomed TES.

In step 302, when the multicast packet is an NVO3-encapsulated packet, it is determined that the sender of the multicast packet is another NVE. When the multicast packet is an Ethernet packet without NVO3 encapsulation and an ingress port of the multicast packet is a port in a LAG, it is determined that the sender of the multicast packet is a multihomed TES. The other NVE is any NVE other than the first multihoming NVE on the NVO3 network, which may be a multihoming NVE or may be an ordinary NVE.

Step 303. The first multihoming NVE performs NVO3 decapsulation on the multicast packet and acquires a VN ID of the multicast packet from an NVO3 header of the multicast packet.

The NVO3 header herein includes both a normal NVO3 header and an extended NVO3 header.

Step 304: The first multihoming NVE looks up a local multicast forwarding entry corresponding to the VN ID, and acquires an egress port in the local multicast forwarding entry.

A local multicast forwarding table is pre-configured or pre-generated on an NVE, as shown in Table 1. Each local multicast forwarding entry includes a VN ID, a port, and a VLAN ID.

TABLE 1

| VN ID | Port | VLAN ID |
|---|---|---|
| FFFFF1 | 1 | AA1 |
| FFFFF2 | 2 | AA2 |
| FFFFF3 | 3 | AA3 |
| ... | ... | ... |

When the first multihoming NVE receives a multicast packet from a port, the port is called an ingress port. When the first multihoming NVE sends a multicast packet from a port, the port is called an egress port. In this step, the multicast packet is received from another NVE and needs to be sent to a TES connected to the first multihoming NVE. Therefore, the port is called the egress port.

After finding the local multicast forwarding entry, the first multihoming NVE acquires the egress port from the local multicast forwarding entry. Before sending the NVO3-decapsulated multicast packet by using the egress port that is found in the local multicast forwarding entry, the first multihoming NVE encapsulates the multicast packet with a corresponding VLAN ID.

Step 305: The first multihoming NVE determines whether the egress port is a DF of the VN ID, and processes the decapsulated second multicast packet according to a result of the determining.

The processing the decapsulated second multicast packet according to a result of the determining includes performing step 307 when the egress port is the DF of the VN ID, or performing step 306 when the egress port is not the DF of the VN ID.

The DF is determined by negotiation between the first multihoming NVE and a second multihoming NVE (which refers to another one or more multihoming NVEs, where a port of the second multihoming NVE and a port of the first multihoming NVE belong to a same LAG), or pre-configured by an administrator.

In step 305, the first multihoming NVE searches a DF table according to the VN ID and the egress port, and determines whether the egress port is the DF of the VN ID according to a found DF entry. The DF table is pre-configured on the first multihoming NVE or pre-generated by the first multihoming NVE. An entry of the DF table includes a VN ID, an egress port, and a DF marker. The DF marker is used to mark whether the egress port is the DF of the VN ID. When there is no entry corresponding to the VN ID and the egress port in the DF table, or a DF marker in a found entry indicates that the egress port is not the DF, it is determined that the egress port is not the DF of the VN ID.

Step 306: The first multihoming NVE discards the decapsulated second multicast packet.

To avoid a packet repetition problem that multiple multihoming NVEs of the VN ID all forward a multicast packet to a multihomed TES, when an egress port of the first multihoming NVE is not the designated forwarder of the VN ID, the first multihoming NVE discards the multicast packet on the egress port, that is, the first multihoming NVE does not send the multicast packet to a multihomed TES connected to an egress port in the local multicast forwarding entry.

Step 307: The first multihoming NVE determines whether the multicast packet and the egress port have a same LAG ID, performs step 308 when the multicast packet and the egress port have a same LAG ID, and performs step 309 when the multicast packet and the egress port do not have a same LAG ID. A LAG ID of the multicast packet is obtained from the NVO3 header of the multicast packet.

That the multicast packet and the egress port do not have a same LAG ID includes: the NVO3 header is a normal NVO3 header without carrying a LAG ID, or a LAG ID carried in the NVO3 header is an invalid value, or a LAG ID carried in the NVO3 header is different from a LAG ID of the egress port. The LAG ID of the egress port is pre-configured.

Step 308: The first multihoming NVE discards the decapsulated second multicast packet.

That the multicast packet and the egress port have a same link aggregation group identifier indicates that the multicast packet is forwarded by using a non-DF port of the VN ID by another multihoming NVE that belongs to a same link aggregation group as the first multihoming NVE where the multicast packet is sent by a multihomed TES connected to the egress port. To avoid that the multicast packet sent by the multihomed TES is looped back to the multihomed TES, the first multihoming NVE discards the multicast packet on the egress port, that is, the multicast packet is not forwarded by using the egress port.

Step 309: The first multihoming NVE forwards the decapsulated second multicast packet by using the egress port.

That the multicast packet and the egress port have different link aggregation group identifiers indicates that the multicast packet is not a multicast packet coming from the egress port, and that sending the multicast packet to the egress port does not cause a loop on a multihomed TES connected to the egress port. In addition, because the egress port is a DF corresponding to the VN ID, that the first multihoming NVE forwards the multicast packet by using the egress port also does not cause that the multihomed TES connected to the egress port repeatedly receives the multicast packet.

Step 310: The first multihoming NVE acquires an ingress port of the multicast packet and a VLAN ID of the multicast packet, and acquires a VN ID of the first multicast packet according to the ingress port and the VLAN ID.

NVO3 encapsulation is not performed on the multicast packet sent by the multihomed TES. Therefore, a VN ID is not carried in a packet header. In this case, a local multicast forwarding table may be searched according to the ingress port of the multicast packet and the VLAN ID of the multicast packet, to acquire the VN ID of the multicast packet.

The local multicast forwarding table in this step is shown in Table 1. The multicast packet is a packet received from the multihomed TES. Therefore, a port from which the multicast packet is received is called an ingress port.

Step 311: The first multihoming NVE determines whether the ingress port is a DF of the VN ID, performs step 312 when the ingress port is the DF of the VN ID, and performs step 313 when the ingress port is not the DF of the VN ID.

The first multihoming NVE searches a DF table according to the ingress port and the VN ID of the multicast packet, and determines whether the ingress port is the DF of the VN ID of the multicast packet, where each entry of the DF table includes a VN ID, a port, and a DF marker. When there is no entry that is corresponding to the VN ID of the multicast packet and the ingress port and in the DF table, or a DF marker in a found entry indicates that the ingress port is not the DF, it is determined that the ingress port is not the DF of the VN ID.

Step 312: The first multihoming NVE performs normal NVO3 encapsulation on the multicast packet and sends the multicast packet to another NVE.

In this step, the ingress port is the DF of the VN ID and can forward a packet of the VN ID; therefore, the first multihoming NVE encapsulates the multicast packet by adding the VN ID to an NVO3 header of the multicast packet, and then sends the multicast packet to the another NVE. In addition, the first multihoming NVE may further multicast, according to the local multicast forwarding table, the multicast packet by using another local port other than the ingress port to another local TES other than the multihomed TES that sends the multicast packet.

The normal NVO3 encapsulation described in this embodiment means that an NVO3 header resulting from the encapsulation carries only a VN ID.

Step 313: The first multihoming NVE encapsulates the multicast packet with an extended NVO3 header, and sends the multicast packet that is encapsulated with the extended NVO3 header to another NVE.

The extended NVO3 header described in this embodiment is an NVO3 header that carries a VN ID and a LAG ID. The LAG ID is a LAG ID of a LAG to which the ingress port belongs. In addition, the extended NVO3 header may further carry a flag bit, where the flag bit is used to indicate that the extended NVO3 header carries a LAG ID.

In this step, the ingress port is not the DF of the VN ID; therefore, to avoid a loop on a TES that sends the multicast packet, the first multihoming NVE does not multicast the multicast packet to local ports, but sends the multicast packet only to another NVE. Therefore, the first multihoming NVE encapsulates the multicast packet with the VN ID and a LAG ID of the ingress port, so that a second multihoming NVE that receives the multicast packet determines whether the second multihoming NVE can multicast the multicast packet to local ports.

To clearly explain technical solutions of the present disclosure, in the foregoing FIG. 3, various possible processing procedures are included after the first multihoming NVE receives the multicast packet. In actual application, for different multicast packets, FIG. 3 may be split into the following processing procedures, where each procedure can independently form a method for processing a multicast packet on an NVO3 network.

Procedure A, including steps 301, 302, 310, 311, and 312, is used to process a first multicast packet, where characteristics of the first multicast packet may be obtained from descriptions of the foregoing steps.

Procedure B, including steps 301, 302, 310, 311, and 313, is used to process a second multicast packet, where characteristics of the second multicast packet may be obtained from descriptions of the foregoing steps.

Procedure C, including steps 301, 302, 303, 304, 305, and 306, is used to process a third multicast packet, where characteristics of the third multicast packet may be obtained from descriptions of the foregoing steps.

Procedure D, including steps 301, 302, 303, 304, 305, 307, and 308, is used to process a fourth multicast packet, where characteristics of the fourth multicast packet may be obtained from descriptions of the foregoing steps.

Procedure E, including steps 301, 302, 303, 304, 305, 307, and 309, is used to process a fifth multicast packet, where characteristics of the fifth multicast packet may be obtained from descriptions of the foregoing steps.

The foregoing first, second, third, fourth, and fifth are merely used for exemplary descriptions, and do not limit the order of the multicast packets. The foregoing procedures A to E can each independently complete processing of one type of multicast packet. Therefore, the method for processing a multicast packet on an NVO3 network in this embodiment of the present disclosure only needs to include at least any one of the foregoing procedures. When one of the procedures is chosen to be protected, steps in the other procedures may be considered to be an optional implementation manner of the method described in this embodiment of the present disclosure.

For example, in an embodiment, a first multihoming NVE receives a first multicast packet, and when it is determined that a sender of the first multicast packet is a local multihomed TES, performs steps 310, 311, and 313 for the first multicast packet, where other steps are optional. In another embodiment, the first multihoming NVE further receives a second multicast packet in addition to receiving the first multicast packet, and then performs one or more steps of 303 to 309 according to characteristics of the second multicast packet.

In the foregoing embodiment of the present disclosure, when a first multihoming NVE receives a first multicast packet from a multihomed TES, and when it is determined that an ingress port of the first multicast packet is not a DF of a VN ID carried in the multicast packet, the first multihoming NVE does not forward the first multicast packet to a local port, thereby avoiding that the first multicast packet sent by the multihomed TES is looped back to the multihomed TES. In addition, by extending an existing NVO3 header and using an existing LAG ID, IP address wasting can be avoided, thereby improving the forwarding efficiency.

Figure 4:
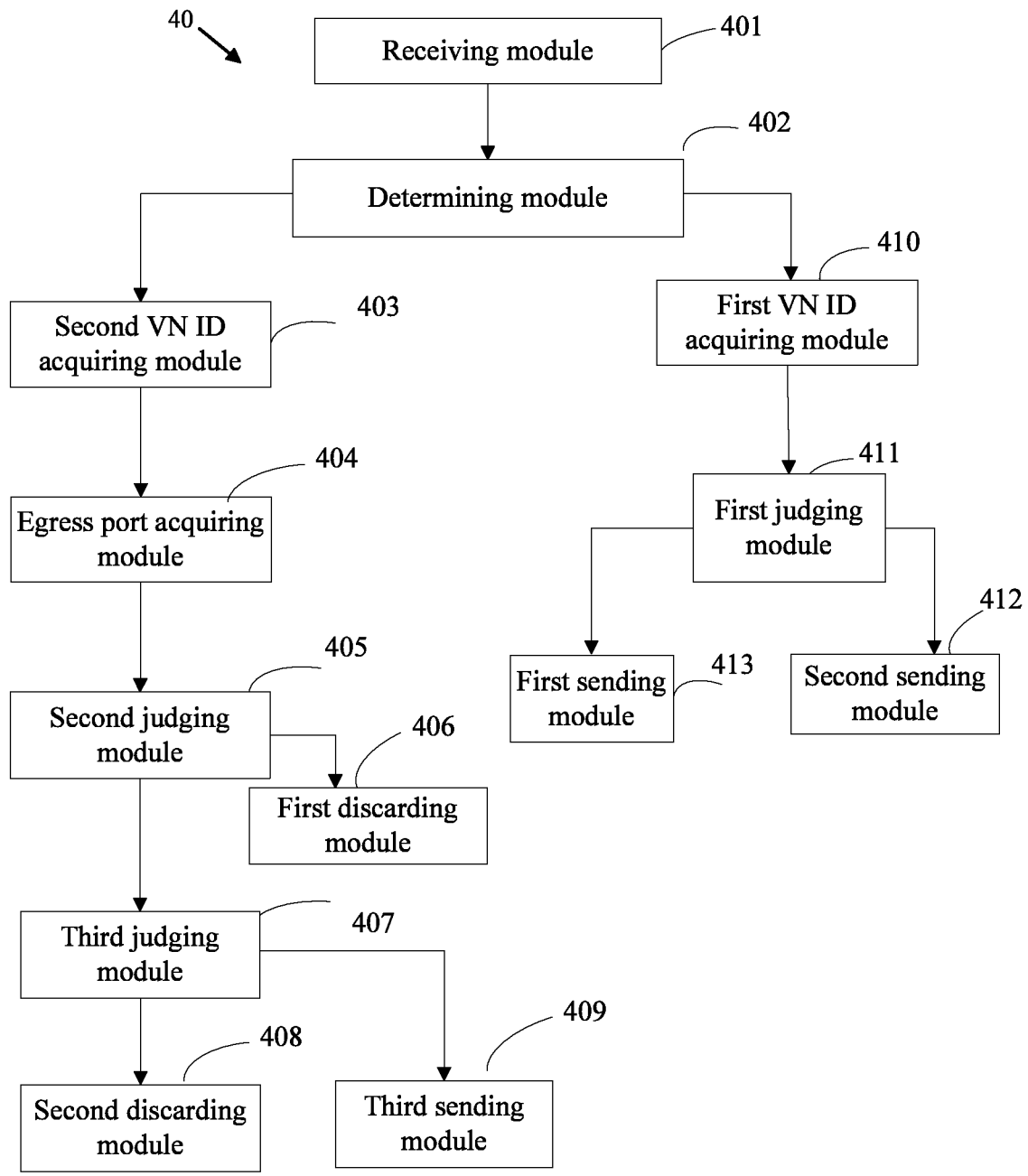
FIG. 4 is a schematic structural diagram of an apparatus for processing a multicast packet on an NVO3 network according to an embodiment of the present disclosure.

In addition, an embodiment of the present disclosure provides an apparatus for processing a multicast packet on an NVO3 network, configured to execute the method shown in FIG. 3. As shown in FIG. 4, the apparatus 40 includes:

A receiving module 401 is configured to receive a multicast packet. The multicast packet includes all packets, such as a broadcast packet, a multicast packet, or an unknown unicast packet, that need to be sent in a multicast manner on the NVO3 network.

A determining module 402 is configured to determine a sender of the multicast packet, trigger a second VN ID acquiring module 403 when it is determined that the sender of the multicast packet is an NVE, and trigger a first VN ID acquiring module 410 when it is determined that the sender of the first multicast packet is a local multihomed TES.

The determining module 402 is configured to determine that the sender of the multicast packet is another NVE when the multicast packet is an NVO3-encapsulated packet; and when the multicast packet is an Ethernet packet without NVO3 encapsulation and an ingress port of the multicast packet is a port in a LAG, determine that the sender of the multicast packet is a multihomed TES. The other NVE is any NVE on the NVO3 network, which may be a multihoming NVE or may be an ordinary NVE.

The second VN ID acquiring module 403 is configured to perform NVO3 decapsulation on the multicast packet, and acquire a VN ID of the multicast packet from an NVO3 header of the multicast packet.

The NVO3 header herein includes both a normal NVO3 header and an extended NVO3 header.

An egress port acquiring module 404 is configured to look up a local multicast forwarding entry corresponding to the VN ID of the multicast packet acquired by the second VN ID acquiring module, and acquire an egress port in the local multicast forwarding entry.

The local multicast forwarding table is shown in Table 1 of the embodiment shown in FIG. 3.

A second judging module 405 is configured to determine whether the egress port is a DF of the VN ID, trigger a third judging module 407 when the egress port is the DF of the VN ID, and trigger a first discarding module 406 when the egress port is not the DF of the VN ID.

The DF is determined by negotiation among the multiple multihoming NVEs, or pre-configured by an administrator.

The second judging module 405 is configured to search a DF table according to the VN ID and the egress port, and determine whether the egress port is the DF of the VN ID according to a found DF entry.

An entry of the DF table includes a VN ID, an egress port, and a DF marker. The DF marker is used to mark whether the egress port is the DF of the VN ID. When there is no entry corresponding to the VN ID and the egress port in the DF table, or a DF marker in a found entry indicates that the egress port is not the DF, it is determined that the egress port is not the DF of the VN ID.

The first discarding module 406 is configured to discard, triggered by the second judging module 405, the decapsulated second multicast packet.

To avoid a packet repetition problem that multiple multihoming NVEs of the VN ID all forward a multicast packet to a multihomed TES, when the egress port is not a designated forwarder of the VN ID, the first discarding module 406 discards the multicast packet on the egress port.

The third judging module 407 is configured to determine whether the multicast packet and the egress port have a same LAG ID; trigger a second discarding module 408 when the multicast packet and the egress port have a same LAG ID; and trigger the third sending module 409 when the multicast packet and the egress port do not have a same LAG ID. A LAG ID of the multicast packet is obtained from the NVO3 header of the multicast packet.

That the multicast packet and the egress port do not have a same LAG ID includes: the NVO3 header is a normal NVO3 header without carrying a LAG ID, or a LAG ID carried in the NVO3 header is an invalid value, or a LAG ID carried in the NVO3 header is different from a LAG ID of the egress port. The LAG ID of the egress port is pre-configured.

A second discarding module 408 is configured to discard, triggered by the third judging module, the decapsulated second multicast packet.

That the multicast packet and the egress port have a same LAG identifier indicates that the multicast packet is forwarded by using a non-DF port of the VN ID by another multihoming NVE that belongs to a same LAG as the apparatus, where the multicast packet is a multicast packet from a multihomed TES connected to the egress port. To avoid that the multicast packet sent by the multihomed TES is looped back to the multihomed TES, the second discarding module 408 discards the multicast packet on the egress port, that is, the multicast packet is not forwarded by using the egress port.

The third sending module 409 is configured to forward the decapsulated second multicast packet by using the egress port.

That the multicast packet and the egress port have different LAG identifiers indicates that the multicast packet is not a multicast packet coming from the egress port, and that sending the multicast packet to the egress port does not cause a loop on a multihomed TES connected to the egress port. In addition, because the egress port is a DF corresponding to the VN ID, that the third sending module 409 forwards the multicast packet by using the egress port also does not cause that the multihomed TES connected to the egress port repeatedly receives the multicast packet.

The first VN ID acquiring module 410 is configured to acquire an ingress port of the multicast packet and a VLAN ID of the multicast packet, and acquire a VN ID of the first multicast packet according to the ingress port and the VLAN ID.

NVO3 encapsulation is not performed on the multicast packet sent by the multihomed TES; therefore, a VN ID is not carried in a packet header. In this case, the first VN ID acquiring module 410 searches a local multicast forwarding table according to the ingress port of the multicast packet and the VLAN ID of the multicast packet, to acquire the VN ID of the multicast packet.

The local multicast forwarding table herein is shown in Table 1. The multicast packet is a packet received from the multihomed TES; therefore, a port from which the multicast packet is received is called an ingress port.

The first judging module 411 is configured to determine whether the ingress port is a DF of the VN ID, trigger a second sending module 412 when the ingress port is the DF of the VN ID, and trigger a first sending module 413 when the ingress port is not the DF of the VN ID.

The first judging module 411 searches the DF table according to the ingress port and the VN ID, and determines whether the ingress port is the DF of the VN ID of the multicast packet, where each entry of the DF table includes a VN ID, a port, and a DF marker. When there is no entry corresponding to the VN ID and the ingress port of the multicast packet in the DF table, or a DF marker in a found entry indicates that the ingress port is not the DF, it is determined that the ingress port is not the DF of the VN ID.

The second sending module 412 is configured to send a multicast packet with normal NVO3 encapsulation to another NVE.

Herein, the ingress port is the DF of the VN ID and can forward a packet of the VN ID; therefore, the second module 412 encapsulates the multicast packet by adding the VN ID to an NVO3 header of the multicast packet, and then sends the multicast packet to the another NVE. In addition, the second sending module 412 may further multicast, according to the local multicast forwarding table, the multicast packet by using another local port other than the ingress port to another local TES other than a multihomed TES of the multicast packet.

The normal NVO3 encapsulation described in this embodiment means that an NVO3 header resulting from the encapsulation carries only a VN ID.

The first sending module 413 is configured to encapsulate the multicast packet with an extended NVO3 header, and send the multicast packet that is encapsulated with the extended NVO3 header to another NVE.

The extended NVO3 header described in this embodiment is an NVO3 header that carries a VN ID and a LAG ID. The LAG ID is a LAG ID of a LAG to which the ingress port belongs. In addition, the extended NVO3 header may further carry a flag bit, where the flag bit is used to indicate that the extended NVO3 header carries a LAG ID.

The ingress port is not the DF of the VN ID; therefore, to avoid causing a loop on a TES that sends the multicast packet, the first sending module 413 does not multicast the multicast packet to local ports, but sends the multicast packet only to another NVE. Therefore, the first sending module 413 encapsulates the multicast packet with the VN ID and a LAG ID of the ingress port, so that a multihoming NVE that receives the multicast packet determines whether the multihoming NVE can multicast the multicast packet to the local port.

To clearly explain the technical solutions of the present disclosure, the foregoing FIG. 4 includes various possible modules that need to participate in processing a multicast packet after an apparatus for processing a multicast packet on an NVO3 network receives the multicast packet. In actual application, for different multicast packets, the modules in FIG. 4 may be classified into the following several groups. Each group can independently form an apparatus for processing a multicast packet on an NVO3 network.

Group A, including modules 401, 402, 410, 411, and 412, is used to process a first multicast packet, where characteristics of the first multicast packet may be obtained from descriptions of the foregoing modules.

Group B, including modules 401, 402, 410, 411, and 413, is used to process a second multicast packet, where characteristics of the second multicast packet may be obtained from descriptions of the foregoing modules.

Group C, including modules 401, 402, 403, 404, 405, and 406, is used to process a third multicast packet, where characteristics of the third multicast packet may be obtained from descriptions of the foregoing modules.

Group D, including modules 401, 402, 403, 404, 405, 407, and 408, is used to process a fourth multicast packet, where characteristics of the fourth multicast packet may be obtained from descriptions of the foregoing modules.

Group E, including modules 401, 402, 403, 404, 405, 407, and 409, is used to process a fifth multicast packet, where characteristics of the fifth multicast packet may be obtained from descriptions of the foregoing modules.

The foregoing first, second, third, fourth, and fifth are merely used for exemplary descriptions, and do not limit the order of the multicast packets. The foregoing groups of modules may simultaneously be called for processing different multicast packets, or may be called separately. Any manner of calling the foregoing groups of modules shall fall within the protection scope of the present disclosure. The foregoing group A to group E can each independently complete processing of one type of multicast packet. Therefore, the apparatus for processing a multicast packet on an NVO3 network in this embodiment of the present disclosure only needs to include at least any one group of the foregoing groups of modules. When one group of modules is chosen to be protected, the other groups of modules may all be considered as optional implementation manners of the apparatus described in this embodiment of the present disclosure.

For example, in an embodiment, the receiving module 401 receives a first multicast packet, when the determining module 402 determines that a sender of the first multicast packet is a local multihomed TES, the determining module 402 triggers the first VN ID acquiring module 410, the first judging module 411 and the first sending module 413 to perform corresponding operations. In another embodiment, the receiving module 401 further receives a second multicast packet in addition to receiving the first multicast packet, and then calls one or more of modules 403 to 409 according to characteristics of the second multicast packet.

Figure 5:
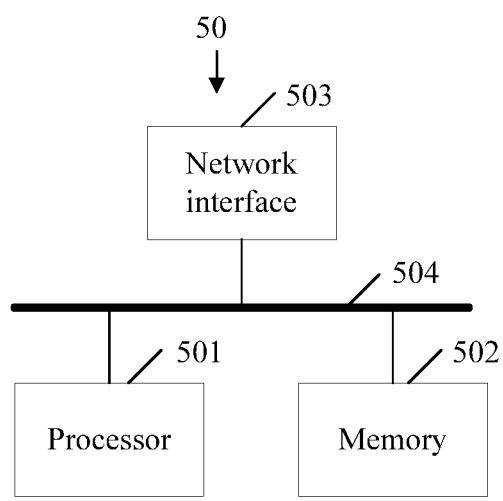
FIG. 5 is a schematic structural diagram of another apparatus for processing a multicast packet on an NVO3 network according to an embodiment of the present disclosure.

FIG. 5 is a schematic structural diagram of another apparatus for processing a multicast packet on an NVO3 network according to an embodiment of the present disclosure. As shown in the figure, the apparatus 50 for processing a multicast packet on an NVO3 network includes a processor 501, a memory 502, a network interface 503, and a bus 504. The processor 501, the memory 502, and the network interface 503 are all connected to the bus 504.

The processor 501 is configured to receive a multicast packet by using the network interface 503, and execute, according to characteristics of the multicast packet, one or more of procedures A to E in the method that is shown in FIG. 3.

The foregoing processing process executed by the processor 501 is generally implemented under control of one or more software programs, and program instructions of the one or more software programs are stored in the memory 502. When the foregoing operations need to be performed, the processor 51 reads the program instructions, and performs, according to the program instructions, some or all of the steps of the method that is shown in FIG. 3.

In the foregoing embodiment of the present disclosure, when an apparatus receives a first multicast packet from a multihomed TES, and when it is determined that an ingress port of the first multicast packet is not a DF of a VN ID carried in the multicast packet, the first multicast packet is not forwarded to a local port, thereby avoiding that the first multicast packet sent by the multihomed TES is looped back to the multihomed TES. In addition, by extending an existing NVO3 header and using an existing LAG ID, IP address wasting can be avoided, thereby improving the forwarding efficiency.

The foregoing embodiments of the present disclosure belong to a same conception; therefore, a same term in the embodiments has a same meaning and can be mutually referenced.

Persons of ordinary skill in the art may understand that all or some of the steps of the method embodiment may be implemented by a program instructing relevant hardware. The program may be stored in a computer-readable storage medium. When the program runs, the steps of the method embodiment are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for processing a multicast packet on a network virtualization over layer 3 (NVO3) network, comprising:
receiving a first multicast packet from a local multihomed tenant end system (TES);
acquiring an ingress port of the first multicast packet and a virtual local area network (VLAN) identifier (ID) of the first multicast packet;
acquiring a first virtual overlay network (VN) ID of the first multicast packet according to the ingress port and the VLAN ID;
determining whether the ingress port is the designated forwarder (DF) of the first VN ID;
encapsulating the first multicast packet with an extended NVO3 header when the ingress port is not the DF of the first VN ID; and
sending the first multicast packet encapsulated with the extended NVO3 header to a first network virtualization edge (NVE),
wherein the extended NVO3 header carries the first VN ID of the first multicast packet and a first link aggregation group (LAG) ID that corresponds to the ingress port.

2. The method according to claim 1, wherein the determining whether the ingress port is the DF of the first VN ID comprises:
searching a DF table according to the ingress port and the first VN ID of the first multicast packet to produce a search result; and
determining whether the ingress port is the DF of the first VN ID of the first multicast packet according to the search result, and
wherein each entry of the DF table comprises a VN ID, a port, and a DF marker.

3. The method according to claim 1, further comprising:
receiving a second multicast packet from a second NVE;
performing NVO3 decapsulation on the second multicast packet;
acquiring a second VN ID of the second multicast packet from an NVO3 header of the second multicast packet;
looking up a local multicast forwarding entry corresponding to the second VN ID of the second multicast packet;
acquiring an egress port in the local multicast forwarding entry;
determining whether the egress port is the DF of the second VN ID of the second multicast packet to produce a determination result; and
processing the decapsulated second multicast packet according to the determination result.

4. The method according to claim 3, wherein the processing the decapsulated second multicast packet according to the determination result comprises discarding the decapsulated second multicast packet when determining that the egress port is not the DF of the second VN ID of the second multicast packet.

5. The method according to claim 3, wherein the processing the decapsulated second multicast packet according to the determination result comprises:
obtaining a second LAG ID of the second multicast packet from the NVO3 header of the second multicast packet; and
determining whether the second multicast packet and the egress port comprise a same LAG ID when determining that the egress port is the DF of the second VN ID of the second multicast packet.

6. The method according to claim 5, further comprising discarding the decapsulated second multicast packet when determining that the second multicast packet and the egress port comprise the same LAG ID.

7. The method according to claim 5, further comprising forwarding the decapsulated second multicast packet through the egress port when determining that the second multicast packet and the egress port do not comprise the same LAG ID.

8. A network virtualization over layer 3 (NVO3) network, comprising:
a first multihomed network virtualization edge (NVE); and
a second multihoming NVE,
wherein the first multihoming NVE is configured to:
receive a first multicast packet from a multihomed tenant end system (TES), wherein the multihomed TES is separately connected to the first multihoming NVE and the second multihoming NVE;
acquire an ingress port of the first multicast packet and a virtual local area network (VLAN) identifier (ID) of the first multicast packet;
acquire a first virtual overlay network (VN) ID of the first multicast packet according to the ingress port of the first multicast packet and the VLAN ID;
determine whether the ingress port is the designated forwarder (DF) of the first VN ID of the first multicast packet; encapsulate the first multicast packet with an extended NVO3 header when the ingress port is not the DF of the first VN ID of the first multicast packet; and
send the first multicast packet that is encapsulated with the extended NVO3 header to another NVE that comprises the second multihoming NVE, and
wherein the extended NVO3 header carries the first VN ID of the first multicast packet and a first link aggregation group (LAG) ID that corresponds to the ingress port.

9. The NVO3 network according to claim 8, wherein the first multihoming NVE is further configured to:
search a DF table according to the ingress port and the first VN ID of the first multicast packet; and
determine whether the ingress port is the DF of the first VN ID of the first multicast packet, and
wherein each entry of the DF table comprises a VN ID, a port, and a DF marker.

10. The NVO3 network according to claim 8, wherein the second multihoming NVE is configured to send a second multicast packet, and wherein the first multihoming NVE is further configured to:
receive the second multicast packet;
perform NVO3 decapsulation on the second multicast packet;
acquire a second VN ID of the second multicast packet from an NVO3 header of the second multicast packet;
look up a local multicast forwarding entry corresponding to the second VN ID of the second multicast packet;
acquire an egress port in the local multicast forwarding entry;
determine whether the egress port is the DF of the second VN ID of the second multicast packet to produce a determination result; and process the decapsulated second multicast packet according to the determination result.

11. The NVO3 network according to claim 10, wherein the first multihoming NVE is further configured to discard the decapsulated second multicast packet when determining that the egress port is not the DF of the second VN ID of the second multicast packet.

12. The NVO3 network according to claim 10, wherein the first multihoming NVE is further configured to:
 obtain a second LAG ID of the second multicast packet from the NVO3 header of the second multicast packet; and
 determine whether the second multicast packet and the egress port have a same LAG ID when determining that the egress port is the DF of the second VN ID of the second multicast packet.

13. The NVO3 network according to claim 12, wherein the first multihoming NVE is further configured to discard the decapsulated second multicast packet when the second multicast packet and the egress port have the same LAG ID.

14. The NVO3 network according to claim 12, wherein the first multihoming NVE is further configured to forward the decapsulated second multicast packet through the egress port when the second multicast packet and the egress port do not have the same LAG ID.

15. An apparatus for processing a multicast packet on a network virtualization over layer 3 (NVO3) network, comprising:
 a memory configured to store program instructions;
 a processor coupled to the memory and configured to read the program instructions stored in the memory, and execute the program instructions to:
  receive a first multicast packet;
  acquire an ingress port of the first multicast packet and a virtual local area network (VLAN) identifier (ID) of the first multicast packet when a sender of the first multicast packet is a local multihomed tenant end system (TES);
  acquire a first virtual overlay network (VN) ID of the first multicast packet according to the ingress port and the VLAN ID;
  determine whether the ingress port is the designated forwarder (DF) of the first VN ID; and
  encapsulate the first multicast packet with an extended NVO3 header when the ingress port is not the DF of the first VN ID; and
  send the first multicast packet that is encapsulated with the extended NVO3 header to a first network virtualization edge (NVE);
 a network interface; and
 a bus connecting to the processor, the memory, and the network interface, wherein the extended NVO3 header carries the first VN ID of the first multicast packet and a first link aggregation group (LAG) ID that corresponds to the ingress port.

16. The apparatus according to claim 15, wherein the processor is further configured to execute the program instructions to determine whether the ingress port is the DF of the first VN ID by:
 searching a DF table according to the ingress port and the first VN ID of the first multicast packet; and
 determining whether the ingress port is the DF of the first VN ID of the first multicast packet, and
 wherein each entry of the DF table comprises a VN ID, a port and a DF marker.

17. The apparatus according to claim 15, wherein the processor is further configured to execute the program instructions to:
 receive a second multicast packet;
 perform NVO3 decapsulation on the second multicast packet when a sender of the second multicast packet is an NVE;
 acquire a second VN ID of the second multicast packet from an NVO3 header of the second multicast packet;
 look up a local multicast forwarding entry corresponding to the second VN ID of the second multicast packet;
 acquire an egress port in the local multicast forwarding entry;
 determine whether the egress port is the DF of the second VN ID of the second multicast packet to produce a determination result; and
 process the decapsulated second multicast packet according to the determination result.

18. The apparatus according to claim 17, wherein the processor is further configured to execute the program instructions to process the decapsulated second multicast packet according to the determination result by discarding the decapsulated second multicast packet when determining that the egress port is not the DF of the second VN ID of the second multicast packet.

19. The apparatus according to claim 17, wherein the processor is further configured to execute the program instructions to process the decapsulated second multicast packet according to the determination result by:
 obtaining a second LAG ID from the NVO3 header of the second multicast packet; and
 determining whether the second multicast packet and the egress port have a same LAG ID when determining that the egress port is the DF of the second VN ID of the second multicast packet.

20. The apparatus according to claim 19, wherein processor is further configured to execute the program instructions to forward the decapsulated second multicast packet via the egress port when the second multicast packet and the egress port do not have the same LAG ID.

* * * * *